US012650933B2

(12) United States Patent
Zhang et al.

(10) Patent No.: US 12,650,933 B2
(45) Date of Patent: Jun. 9, 2026

(54) DATA ACCESS METHOD, SWITCH AND STORAGE MEDIUM

(71) Applicant: Suzhou MetaBrain Intelligent Technology Co., Ltd., Suzhou (CN)

(72) Inventors: Guangle Zhang, Suzhou (CN); Guangying Xue, Suzhou (CN); Yuejun Guo, Suzhou (CN); Dongdong Ji, Suzhou (CN)

(73) Assignee: Suzhou MetaBrain Intelligent Technology Co., Ltd., Suzhou (CN)

( * ) Notice: Subject to any disclaimer, the term of this patent is extended or adjusted under 35 U.S.C. 154(b) by 0 days.

(21) Appl. No.: 19/115,274

(22) PCT Filed: Mar. 29, 2024

(86) PCT No.: PCT/CN2024/084644
§ 371 (c)(1),
(2) Date: Mar. 26, 2025

(87) PCT Pub. No.: WO2024/255393
PCT Pub. Date: Dec. 19, 2024

(65) Prior Publication Data
US 2026/0003803 A1 Jan. 1, 2026

(30) Foreign Application Priority Data

Jun. 13, 2023 (CN) .......................... 202310696054.5

(51) Int. Cl.
G06F 13/12 (2006.01)
G06F 13/16 (2006.01)
G06F 13/42 (2006.01)
(52) U.S. Cl.
CPC ........ G06F 13/126 (2013.01); G06F 13/1668 (2013.01); G06F 13/4282 (2013.01)

(58) Field of Classification Search
CPC . G06F 13/126; G06F 13/1668; G06F 13/4282
See application file for complete search history.

(56) References Cited

U.S. PATENT DOCUMENTS

2012/0017074 A1* 1/2012 Kelly .................... G06F 9/4411
718/104
2017/0139592 A1* 5/2017 Qin ......................... G06F 3/061
(Continued)

FOREIGN PATENT DOCUMENTS

CN 103139107 A 6/2013
CN 104408000 A 3/2015
(Continued)

OTHER PUBLICATIONS

International Search Report of corresponding PCT application (PCT/CN2024/084644), Jul. 10, 2024, 5 pages.
(Continued)

*Primary Examiner* — Nimesh G Patel
(74) *Attorney, Agent, or Firm* — Cooper Legal Group, LLC

(57) ABSTRACT

A data access method, a switch and a storage medium, which relate to the technical field of switches. The method is applied to a switch. The switch includes a central processing unit, a baseboard management controller, a main controller and at least one device, wherein the central processing unit and the baseboard management controller are each connected to the main controller, and the main controller is connected to the at least one device. The method includes: receiving, by a main controller, an interface state corresponding to a target interface, and allowing, according to the interface state, a central processing unit or a baseboard management controller to access at least one device by the main controller.

19 Claims, 10 Drawing Sheets

(56)                References Cited

U.S. PATENT DOCUMENTS

| | | | |
|---|---|---|---|
| 2018/0165455 A1* | 6/2018 | Liguori .................. | G06F 21/57 |
| 2023/0085624 A1* | 3/2023 | Olarig .................... | H04L 12/44 |
| | | | 710/313 |
| 2023/0121936 A1* | 4/2023 | Hobbs .................... | G06F 1/183 |
| | | | 713/300 |
| 2023/0140164 A1* | 5/2023 | Chou ..................... | G06F 9/441 |
| | | | 713/2 |

FOREIGN PATENT DOCUMENTS

| | | | |
|---|---|---|---|
| CN | 104516751 | A | 4/2015 |
| CN | 213182724 | U | 5/2021 |
| CN | 112965930 | A | 6/2021 |
| CN | 113760803 | A | 12/2021 |
| CN | 115455397 | A | 12/2022 |
| CN | 116192626 | A | 5/2023 |
| CN | 116431534 | A | 7/2023 |
| JP | 201609139 | A | 5/2016 |

OTHER PUBLICATIONS

Written Opinion of International Searching Authority of corresponding PCT application (PCT/CN2024/084644), Jul. 10, 2024, 7 pages.

First Office Action of corresponding CN priority application (CN202310696054.5), Jul. 20, 2023, 7 pages.

Notification to Grant Patent Right for Invention of corresponding CN priority application (CN202310696054.5), Aug, 9, 2023, 3 pages.

* cited by examiner

Figure 1:
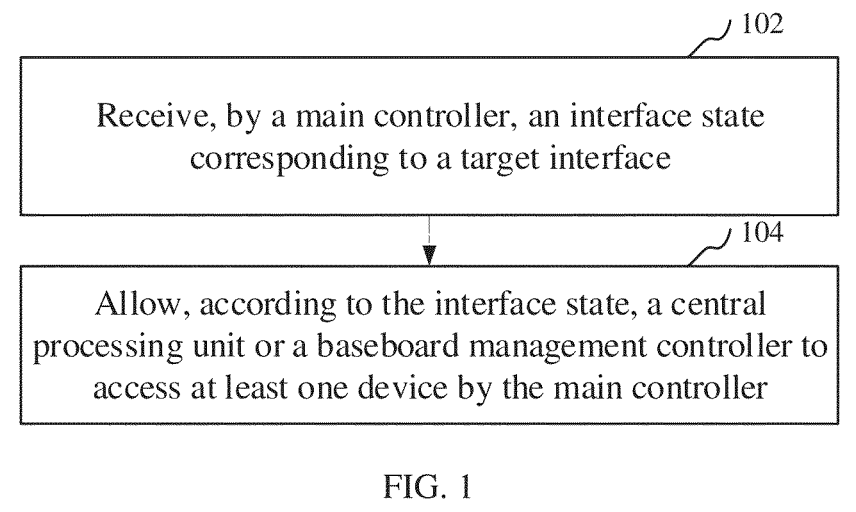

102

Receive, by a main controller, an interface state corresponding to a target interface

104

Allow, according to the interface state, a central processing unit or a baseboard management controller to access at least one device by the main controller

Figures 3, 4:
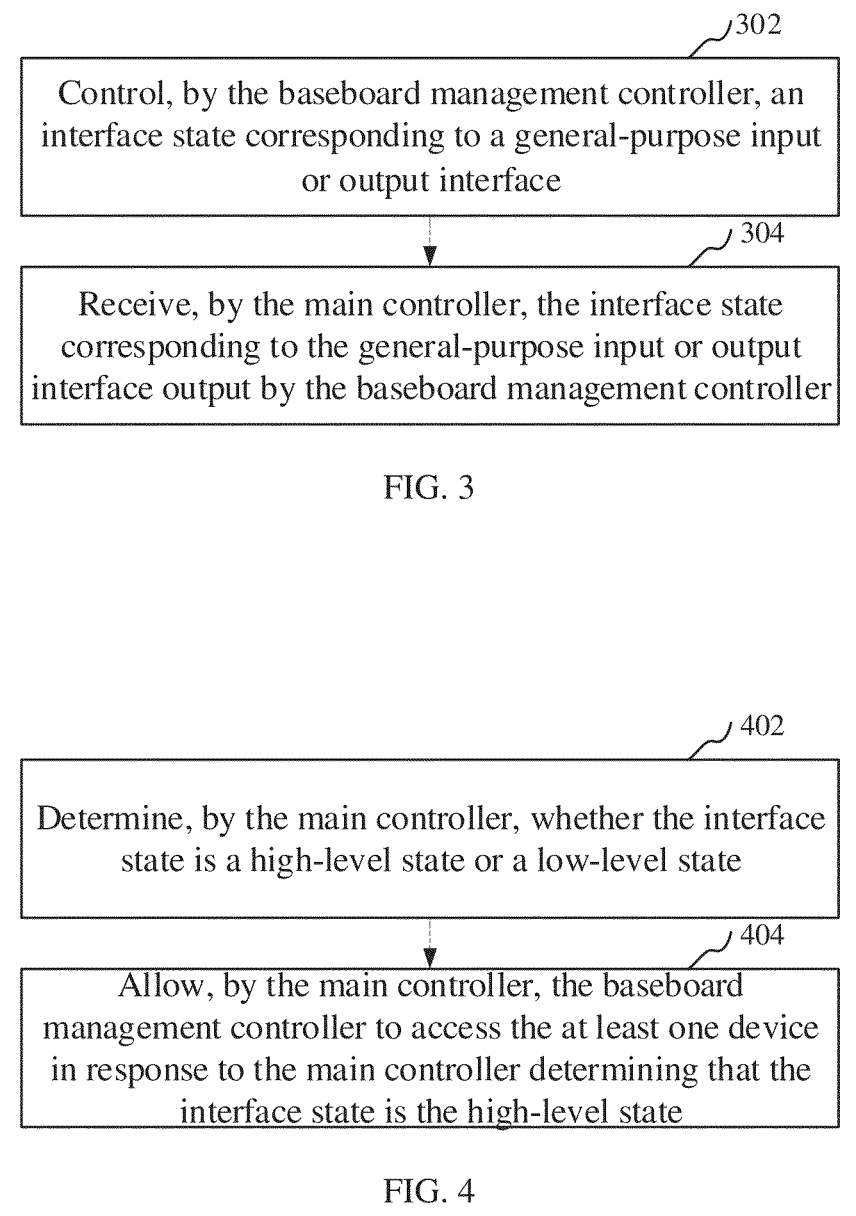

Control, by the baseboard management controller, an interface state corresponding to a general-purpose input or output interface

304

Receive, by the main controller, the interface state corresponding to the general-purpose input or output interface output by the baseboard management controller

Determine, by the main controller, whether the interface state is a high-level state or a low-level state

404

Allow, by the main controller, the baseboard management controller to access the at least one device in response to the main controller determining that the interface state is the high-level state

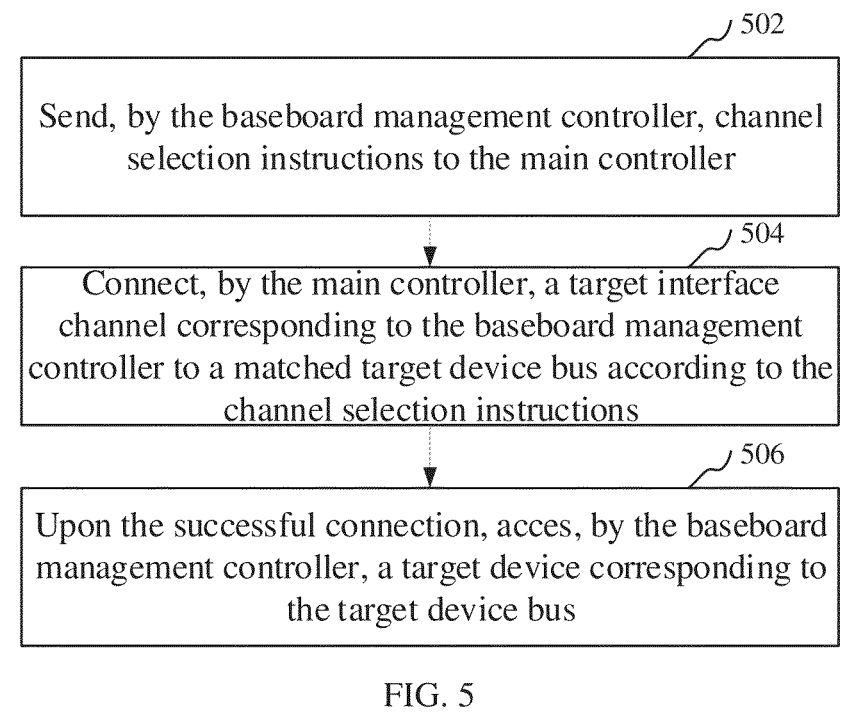

Send, by the baseboard management controller, channel
selection instructions to the main controller

_504

Connect, by the main controller, a target interface
channel corresponding to the baseboard management
controller to a matched target device bus according to the
channel selection instructions

_506

Upon the successful connection, acces, by the baseboard
management controller, a target device corresponding to
the target device bus

FIG. 5

Non-transitory computer-readable storage medium

Computer-readable instructions

FIG. 12

DATA ACCESS METHOD, SWITCH AND STORAGE MEDIUM

CROSS-REFERENCE TO RELATED APPLICATION

This application is the national phase application of International Application No. PCT/CN2024/084644, filed Mar. 29 2024, which claims priority to Chinese Patent Application No. 202310696054.5, filed on Jun. 13, 2023 in China National Intellectual Property Administration and entitled "DATA ACCESS METHOD, SWITCH AND STORAGE MEDIUM". The contents of International Application No. PCT/CN2024/084644 and Chinese Patent Application No. 202310696054.5 are incorporated herein by reference in their entireties.

FIELD

The present application relates to a data access method, a switch and a storage medium.

BACKGROUND

It is well known that an Inter-Integrated Circuit bus (I2C bus) may include a System Management Bus (SMBus) and a Power Management Bus (PMBus); the I2C bus is a low-speed signal bus widely used in a switch system; the basic hardware management functions of the switch system, including temperature monitoring, voltage and current monitoring, fan rotating speed monitoring, etc. all need to be realized via the I2C bus; even more, the system may complete an ON/OFF control over a Power Supply Unit (PSU) output voltage via the I2C bus, so as to realize a power-down restart of the system.

However, the inventors have realized that for the functions of temperature monitoring, voltage and current monitoring, fan rotating speed control and PSU power-down restart in a switch (especially a white box switch) system, some customer requirements are realized by a central processing unit, and some customer requirements are realized by a baseboard management controller; therefore, for different requirements, the I2C bus needs to be connected to different I2C hosts (the central processing unit or the baseboard management controller); and if the same switch needs to meet different customer requirements, a conventional design is realized by using an I2C multi-host arbitration chip, which increases both the system design cost and the complexity of software control.

SUMMARY

According to an embodiment of the present application, in a first aspect, a data access method is provided, where the method is applied to a switch, the switch including a central processing unit, a baseboard management controller, a main controller and at least one device, where the central processing unit and the baseboard management controller are each connected to the main controller, and the main controller is connected to the at least one device, and the method includes:

receiving, by a main controller, an interface state corresponding to a target interface, and allowing, by the main controller, according to the interface state, a central processing unit or a baseboard management controller to access at least one device.

According to an embodiment of the present application, in a second aspect, a switch is provided, the switch including a memory, a processing unit and a computer program stored on the memory and executable on the processing unit, where the processing unit, when executing the computer program, performs the following steps:

receiving, by a main controller, an interface state corresponding to a target interface, and allowing, by the main controller, according to the interface state, a central processing unit or a baseboard management controller to access at least one device.

According to an embodiment, in a third aspect, a non-transitory computer-readable storage medium is provided, which has stored therein a computer program which, when executed by a processing unit, performs the following steps:

receiving, by a main controller, an interface state corresponding to a target interface, and allowing, by the main controller, according to the interface state, a central processing unit or a baseboard management controller to access at least one device.

The details of one or more embodiments of the application are set forth in the accompanying drawings and the description below. Other features and advantages of the application will be apparent from the description and drawings, and from the claims.

BRIEF DESCRIPTION OF THE DRAWINGS

For illustration of the embodiments of the present application or the technical solutions in the prior art more clearly, the following will briefly introduce the drawings which need to be used in the embodiments or the description of the prior art; obviously, the drawings in the following description are merely embodiments of the present application, and it would have been obvious for a person skilled in the art to obtain other drawings according to these drawings without involving any inventive effort.

FIG. 1 is a schematic flow diagram showing a data access method according to one or more embodiments;

FIG. 3 is a schematic flow diagram showing an interface state receiving step according to one or more embodiments;

FIG. 4 is a schematic flow diagram showing access steps according to one or more embodiments;

FIG. 5 is a schematic flow diagram showing access steps according to one or more embodiments;

Figure 12:
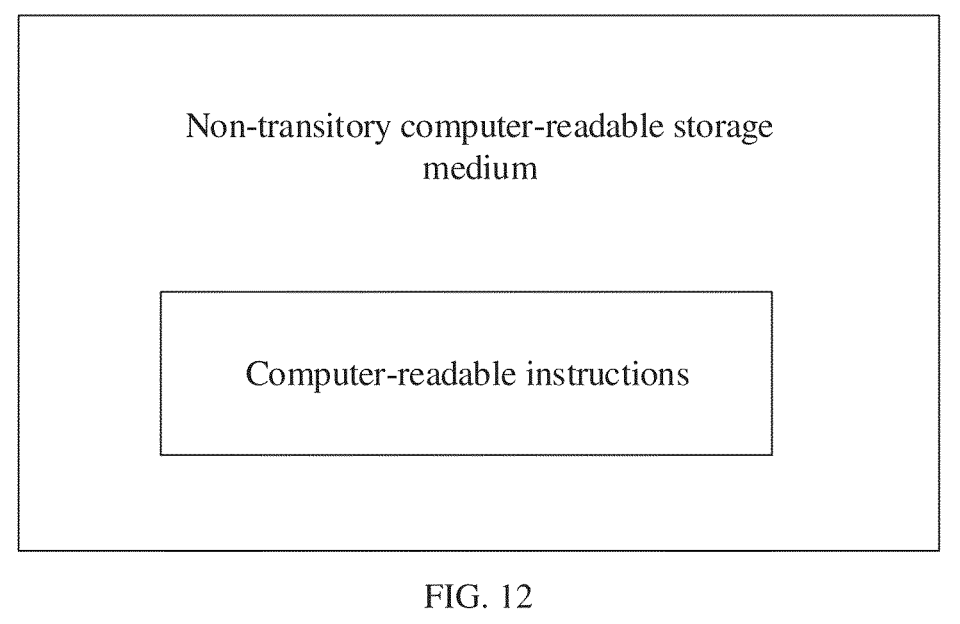

FIG. 12 is a schematic structural diagram showing a non-transitory computer-readable storage medium according to one or more embodiments.

DETAILED DESCRIPTION

To make the objectives, aspects and advantages of the present application may be more clearly understood, a more particular description of the application, briefly summarized below, may be had by reference to the appended drawings and examples. It should be understood that the particular embodiments described herein are illustrative only and are not restrictive.

In some embodiments, as shown in FIG. 1, a data access method is provided, taking the method being applied to a switch as an example, where the switch includes a central processing unit, a baseboard management controller, a main controller and at least one device, the central processing unit and the baseboard management controller are respectively connected to the main controller, and the main controller is connected to the at least one device, and the method includes the following steps:

Step 102 Receiving, by a main controller, an interface state corresponding to a target interface.

Figure 2:
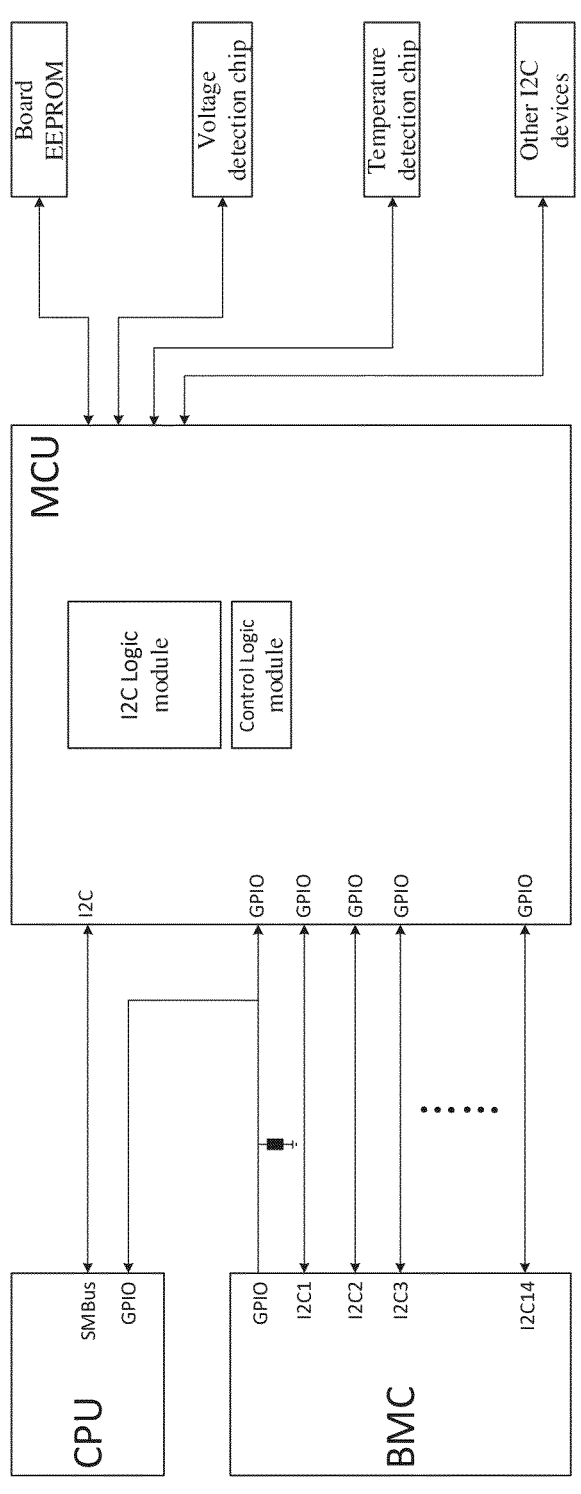
FIG. 2 is a schematic structural diagram showing a switch according to one or more embodiments.

The switch is as shown in FIG. 2, and FIG. 2 is a schematic structural diagram showing a switch according to one or more embodiments; the switch includes a Central Processing Unit (CPU), a Baseboard Management Controller (BMC), a main controller Microcontroller Unit (MCU) and at least one device; the central processing unit CPU might be any System on Chip (SOC) controller with an I2C interface/SMBus interface, for example, Intel Broadwell D1527/D1627, PHYTIUM FT2000/D2000, etc.; and the central processing unit CPU is mainly configured for management control functions of a switch system.

The baseboard management controller BMC may be any type of baseboard management controller, such as Aspeed AST2520. The main controller MCU may be any embedded control chip, such as ST company STM32F103 RBT6.

The device might be an I2C device, and the I2C device might be at least one of a board EEPROM, a voltage detection chip, a temperature detection chip and other I2C device units.

As shown in FIG. 2, a design method of the switch includes a central processing unit, a baseboard management controller, a main controller and at least one device, where the central processing unit and the baseboard management controller are respectively connected to the main controller, and the main controller is connected to the at least one device.

In some embodiments, when the switch system includes a baseboard management controller, the interface state of the target interface is controlled by the baseboard management controller, i.e., the interface state of the target interface is output by the baseboard management controller, and the main controller might receive the interface state corresponding to the target interface. The interface state includes a low-level state and a high-level state.

Step 104 Allowing, by the main controller, according to the interface state, a central processing unit or a baseboard management controller to access at least one device.

In some embodiments, after receiving the interface state corresponding to the target interface, the main controller might control the central processing unit or the baseboard management controller to access at least one downlink device according to the interface state. In some embodiments, when the interface state received by the main controller is a low-level state, it might be indicated that the baseboard management controller does not pull up the interface state of the target interface, and the output voltage value is 0 V; therefore, at this moment, the main controller determines that the switch system is controlled by the central processing unit, i.e., the central processing unit might access at least one downlink device. On the contrary, when the interface state received by the main controller is a high-level state, it is indicated that the baseboard management controller pulls up the interface state of the target interface, and the output voltage value is not 0 V; therefore, at this moment, the main controller determines that the switch system is controlled by the baseboard management controller, i.e., the baseboard management controller might access at least one downlink device.

In the above-mentioned data access method, the designed switch includes a central processing unit, a baseboard management controller, a main controller and at least one device, where the central processing unit and the baseboard management controller are respectively connected to the main controller, and the main controller is connected to the at least one device, without adding additional hardware circuits; the main controller controls the switch to access the at least one downlink device by the central processing unit or the baseboard management controller according to an interface state corresponding to a target interface; and the switch system dynamically switched according to requirements is controlled by the central processing unit or the baseboard management controller; a same switch might be compatible with the design requirements of different customers without adding additional hardware and reducing the system design cost of the switch.

In some embodiments, as shown in FIG. 3, the receiving, by a main controller, an interface state corresponding to a target interface includes:

step 302 Controlling, by the baseboard management controller, an interface state corresponding to a general-purpose input/output interface.

Step 304 Receiving, by the main controller, the interface state corresponding to the general-purpose input/output interface output by the baseboard management controller.

The baseboard management controller is connected to the main controller; the baseboard management controller includes an I2C interface and a General-purpose input/output (GPIO interface) for outputting an I2C bus signal and a general-purpose input/output interface signal; the I2C bus signal is used for data communication with the I2C interface of the embedded controller; at the same time, the general-purpose input/output interface signal (GPIO interface signal) is used for connecting with the general-purpose input/output interface (GPIO interface) of the embedded controller MCU, so as to realize the I2C bus switching between the central processing unit and the baseboard management controller. Therefore, the interface state corresponding to the output general-purpose input/output interface (GPIO interface) might be controlled by the baseboard management controller, and the main controller connected thereto might receive the interface state corresponding to the general-purpose input/output interface (GPIO interface) output by the baseboard management controller, including a low-level state and a high-level state.

In some embodiments, as shown in FIG. 4, the allowing, by the main controller, according to the interface state, a central processing unit or a baseboard management controller to access at least one device includes:

step 402 Determining, by the main controller, whether the interface state is a high-level state or a low-level state.

Step 404 Allowing, by the main controller, the baseboard management controller to access the at least one device in response to the main controller determining that the interface state is the high-level state.

In some embodiments, after receiving the interface state corresponding to the general-purpose input/output interface output by the baseboard management controller, the main controller determines whether the received interface state is a high-level state or a low-level state, and when the interface state received by the main controller is a high-level state, it is indicated that the baseboard management controller pulls up the interface state of the general-purpose input/output interface, and the output voltage value is not 0 V; therefore, at this moment, the main controller determines that the switch system is controlled by the baseboard management controller, i.e., the baseboard management controller might access at least one downlink device.

In some embodiments, as shown in FIG. 5, the allowing, by the main controller, to access by the baseboard management controller to the at least one device includes:

step 502 Sending, by the baseboard management controller, channel selection instructions to the main controller.

Step 504 Connecting, by the main controller, a target interface channel corresponding to the baseboard management controller to a matched target device bus according to the channel selection instructions.

Step 506 Upon the successful connection, accessing, by the baseboard management controller, a target device corresponding to the target device bus.

After the main controller allows the baseboard management controller to access at least one downlink device, the baseboard management controller might send channel selection instructions to the main controller; after receiving the channel selection instructions, the main controller parses the information in the channel selection instructions to determine a target interface channel, and connects the target interface channel corresponding to the baseboard management controller with a matched downlink target device bus; and upon the successful connection, the baseboard management controller might directly access the target device corresponding to the target device bus.

In the present embodiment, the sending, by the baseboard management controller, channel selection instructions to the main controller includes: corresponding channel selection instructions are issued to the main controller using corresponding I2C interfaces via a plurality of interface channels of the baseboard management controller.

Figure 6:
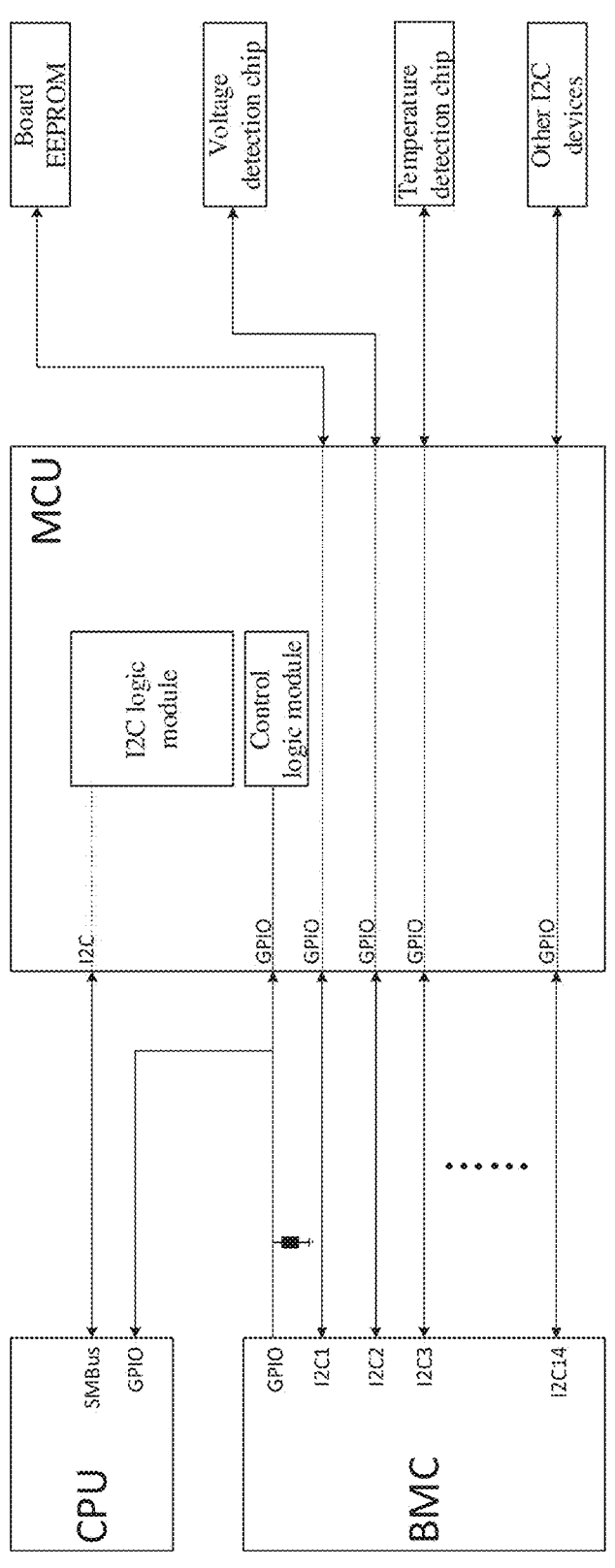
FIG. 6 is a schematic structural diagram showing a baseboard management controller access device in a switch according to one or more embodiments.

For example, as shown in FIG. 6, FIG. 6 is a schematic structural diagram showing a baseboard management controller access device in a switch according to one or more embodiments; the switch in FIG. 6 includes a baseboard management controller (BMC) and a central processing unit (CPU); the main controller is an embedded controller (MCU); and the embedded controller (MCU) determines that the BCM accesses at least one downlink device according to an interface state corresponding to a general-purpose input/output interface (GPIO interface) output by the baseboard management controller (BMC) being a high-level state, for example, a board Electrically Erasable Programmable read only memory (EE-PROM), a voltage detection chip, a temperature detection chip and other I2C devices. It might be seen from FIG. 6 that in addition to a general-purpose input/output interface, the baseboard management controller further includes a plurality of interface channels, where each interface channel corresponds to an I2C interface, and each interface channel of the baseboard management controller might issue a corresponding channel selection instruction to the embedded controller via the corresponding I2C interface.

In the present embodiment, the target interface channel corresponding to the baseboard management controller is connected to the matched target device bus by the main controller according to the channel selection instruction, including: each I2C interface is connected to the matched target device bus by the main controller according to each channel selection instruction.

For example, as shown in FIG. 6, each interface channel of the baseboard management controller sends the channel selection instruction to the embedded controller via the corresponding I2C interface; after receiving each channel selection instruction, the embedded controller connects each I2C interface corresponding to the baseboard management controller to the matched target device bus according to each channel selection instruction; and upon the successful connection, the switch is controlled by the baseboard management controller, and the baseboard management controller might directly access a corresponding downlink device via each I2C interface, for example, the baseboard management controller BMC in FIG. 6 might directly access a corresponding board EEPROM (a downlink device) via the I2C1 interface, for example, the baseboard management controller BMC in FIG. 6 might directly access a corresponding temperature detection chip (a downlink device) via an I2C3 interface.

In some embodiments, the above method further includes: the central processing unit is allowed access to the at least one device by the main controller when the interface state is determined by the main controller to be in a low-level state.

In some embodiments, after receiving the interface state corresponding to the general-purpose input/output interface output by the baseboard management controller, the main controller determines whether the received interface state is a high-level state or a low-level state, and when the interface state is the low-level state, it is indicated that the baseboard management controller does not pull up the interface state of the general-purpose input/output interface, and the output voltage value is 0 V; therefore, at this moment, the main controller of the switch determines that the switch system is controlled by the central processing unit, i.e., the central processing unit might access at least one downlink device.

In the present embodiment, the central processing unit is allowed, by the main controller, to access at least one device, including: a control instruction is sent by the central processing unit to the main controller, a target control mode is selected by the main controller according to the control instruction, and the central processing unit is allowed by the main controller to access at least one device according to the target control mode.

In some embodiments, after the central processing unit is configured to send the control instruction to the main controller, the main controller selects the target control mode according to the control instruction, where different target control modes correspond to different access modes, and further, the main controller controls the central processing unit to access at least one downlink device according to the target control mode. The target control mode includes a switch mode and a cache mode, where the switch mode is that the main controller controls a corresponding channel interface to be connected to the matched target device bus so as to enable the central processing unit to access the corresponding device, and the cache mode is that the main controller caches register information corresponding to all the downlink devices to a cache area, and the central processing unit might read the corresponding register information via the cache area and access the corresponding target device via the register information.

In the present embodiment, the central processing unit is allowed by the main controller to access at least one device according to the target control mode, including: when the target control mode is a switch mode, the channel selection instruction is sent by the central processing unit to the main controller; the corresponding target interface channel is determined by the main controller according to the channel selection instruction; the channel interface corresponding to the target interface channel is connected by the main controller to the matched target device bus; and upon the successful connection, the target device corresponding to the target device bus is accessed by the central processing unit.

Figure 7:
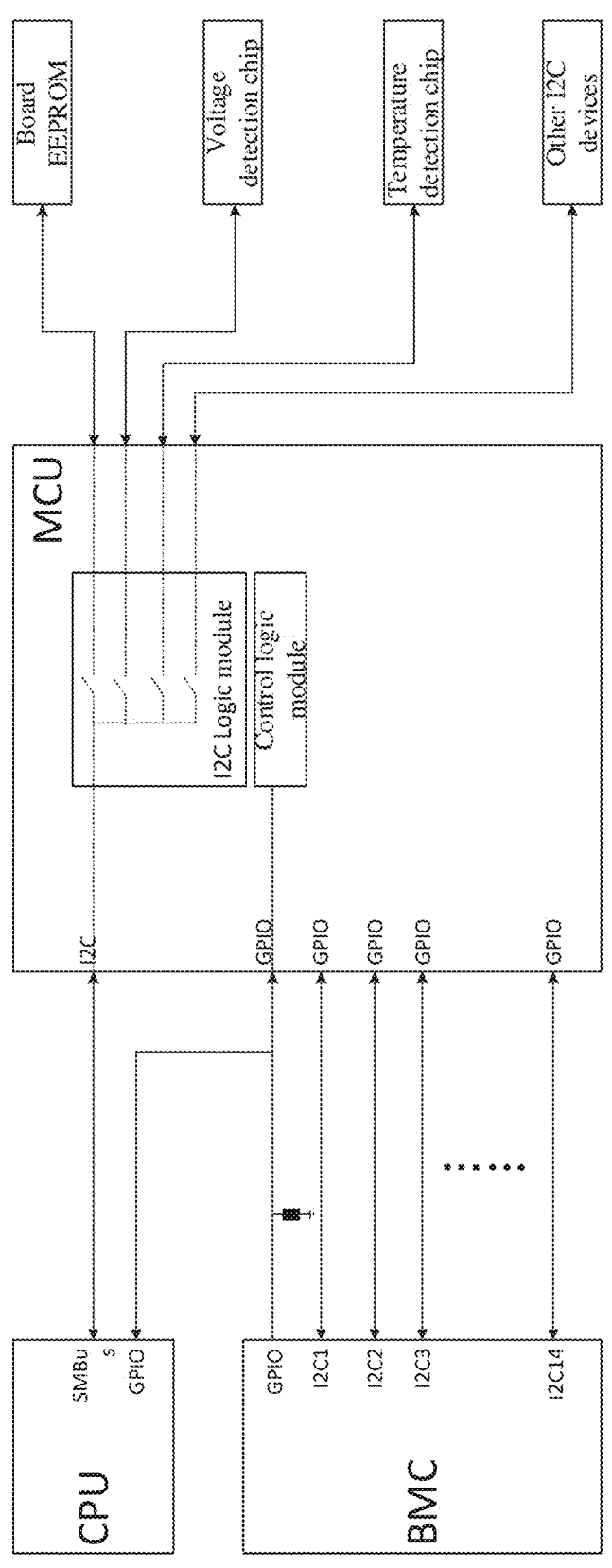
FIG. 7 is a schematic structural diagram showing a central processing unit access device in a switch according to one or more embodiments.

For example, as shown in FIG. 7, FIG. 7 shows a schematic structural diagram showing a central processing unit access device in a switch in one or more embodiments; the switch in FIG. 7 includes a baseboard management controller (BMC) and a central processing unit (CPU); the main controller is an embedded controller (MCU); and the embedded controller determines that the central processing unit accesses at least one downlink device, for example, a board EEPROM, a voltage detection chip, a temperature detection chip and other I2C devices, according to the interface state of a general-purpose input/output interface output by the baseboard management controller being a low-level state. It might be seen from FIG. 7 that when the target control mode is a switch mode, the embedded controller is provided with a switch between the I2C interface of the central processing unit and the downlink device, for example, the I2C interface of the central processing unit is respectively provided with a corresponding switch with the downlink board EEPROM, the voltage detection chip, the temperature detection chip and other I2C devices; the central processing unit might send a channel selection instruction to the embedded controller via the I2C interface; and the embedded controller analyses the received channel selection instructions to obtain a target interface channel; a channel interface corresponding to the target interface channel is connected to the matched target device bus, i.e., a switch corresponding to the target interface is closed; and upon the successful connection, the central processing unit might access a corresponding target device via the target device bus. For example, as shown in FIG. 7, the central processing unit is configured to send a channel selection instruction to the embedded controller, the embedded controller closes the switch of the third channel, and the central processing unit might access a downlink temperature detection chip via the closed channel.

In the present embodiment, the central processing unit is allowed to access at least one device according to a target control mode by the main controller, including: when the target control mode is a cache mode, a device read instruction is sent by the central processing unit to the main controller, register information corresponding to the matched target device is read by the main controller from the cache area according to the device read instruction, the cache area includes register information corresponding to each device, and the target device is accessed by the central processing unit according to the register information.

Figure 8:
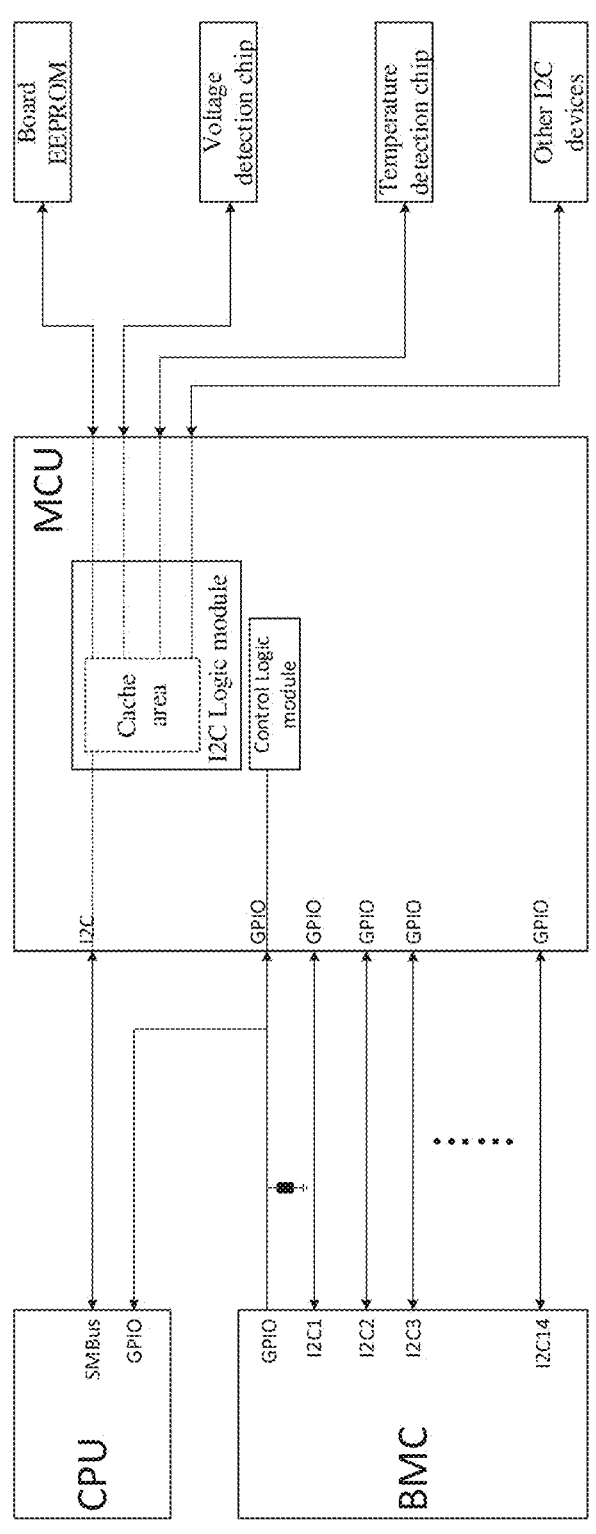
FIG. 8 is a schematic structural diagram showing a central processing unit access device in a switch according to one or more embodiments.

For example, as shown in FIG. 8, FIG. 8 shows a schematic structural diagram showing a central processing unit access device in a switch in one or more embodiments; the switch in FIG. 8 includes a baseboard management controller (BMC) and a central processing unit (CPU); the main controller is an embedded controller (MCU); and the embedded controller determines that the central processing unit accesses at least one downlink device, for example, a board EEPROM, a voltage detection chip, a temperature detection chip and other I2C devices, according to the interface state of a general-purpose input/output interface output by the baseboard management controller being a low-level state. It might be seen from FIG. 8 that when the target control mode is a cache mode, the embedded controller stores register information about all the downlink devices in a cache area in advance, and the downlink devices are, for example, a board EEPROM, a voltage detection chip, a temperature detection chip and other I2C devices; the central processing unit might send a device read instruction to the embedded controller via an I2C interface; after receiving the device read instruction, the embedded controller parses information carried in the device read instruction, and reads register information corresponding to the matched target device from the cache area; the central processing unit may access the corresponding target device according to the read register information.

In some embodiments, when the switch does not include the baseboard management controller, i.e. the baseboard management controller in the switch is not started, the method further includes: an interface state corresponding to the general-purpose input/output interface is received by the main controller as a low-level state, and the central processing unit is allowed by the main controller to access at least one device according to the low-level state.

The baseboard management controller in the switch might be set according to actual requirements and actual application scenarios, and the baseboard management controller may not be included in the switch; at this time, the switch is controlled by the central processing unit, and the interface state corresponding to the general-purpose input/output interface is also controlled by the pull-up resistor; therefore, the interface state corresponding to the general-purpose input/output interface received by the main controller is a low-level state, and further, the main controller allows the central processing unit to access at least one downlink device according to the low-level state.

In the present embodiment, the central processing unit is allowed by the main controller to access at least one device according to the low-level state, including: a control instruction is sent to the main controller by the central processing unit, the target control mode is selected by the main controller according to the control instruction, and the central processing unit is allowed by the main controller to access at least one device according to the target control mode.

In some embodiments, after the central processing unit is configured to send the control instruction to the main controller, the main controller selects the target control mode according to the control instruction, where different target control modes correspond to different access modes, and further, the main controller controls the central processing unit to access at least one downlink device according to the target control mode. The target control mode includes a switch mode and a cache mode, where the switch mode is that the main controller controls a corresponding channel interface to be connected to the matched target device bus so as to enable the central processing unit to access the corresponding device, and the cache mode is that the main controller caches register information corresponding to all the downlink devices to a cache area, and the central processing unit might read the corresponding register information via the cache area and access the corresponding target device via the register information.

In the present embodiment, the central processing unit is allowed by the main controller to access at least one device according to the target control mode, including: when the target control mode is a switch mode, the channel selection instruction is sent by the central processing unit to the main controller; the corresponding target interface channel is determined by the main controller according to the channel selection instruction; the channel interface corresponding to the target interface channel is connected by the main controller to the matched target device bus; and upon the successful connection, the target device corresponding to the target device bus is accessed by the central processing unit.

For example, as shown in FIG. 7, FIG. 7 shows a schematic structural diagram showing a central processing unit access device in a switch in one or more embodiments; the switch in FIG. 7 includes a baseboard management controller (BMC) and a central processing unit (CPU); the main controller is an embedded controller (MCU); and the embedded controller determines that the central processing unit accesses at least one downlink device, for example, a board EEPROM, a voltage detection chip, a temperature detection chip and other I2C devices, according to the interface state of a general-purpose input/output interface output by the baseboard management controller being a low-level state. It might be seen from FIG. 7 that when the target control mode is a switch mode, the embedded controller is provided with a switch between the I2C interface of the central processing unit and the downlink device, for example, the I2C interface of the central processing unit is respectively provided with a corresponding switch with the downlink board EEPROM, the voltage detection chip, the temperature detection chip and other I2C devices; the central processing unit might send a channel selection instruction to the embedded controller via the I2C interface; and the embedded controller analyses the received channel selection instructions to obtain a target interface channel; a channel interface corresponding to the target interface channel is connected to the matched target device bus, i.e., a switch corresponding to the target interface is closed; and upon the successful connection, the central processing unit might access a corresponding target device via the target device bus. For example, as shown in FIG. 7, the central processing unit is configured to send a channel selection instruction to the embedded controller, the embedded controller closes the switch of the third channel, and the central processing unit might access a downlink temperature detection chip via the closed channel.

In the present embodiment, the central processing unit is allowed by the main controller to access at least one device according to a target control mode, including: when a target control mode is a cache mode, a device read instruction is sent by a central processing unit to a main controller, register information corresponding to a matched target device is read by the main controller from a cache area according to the device read instruction, the cache area includes register information corresponding to each device, and the target device is accessed by the central processing unit according to the register information.

For example, as shown in FIG. 8, FIG. 8 shows a schematic structural diagram showing a central processing unit access device in a switch in one or more embodiments; the switch in FIG. 8 includes a baseboard management controller (BMC) and a central processing unit (CPU); the main controller is an embedded controller (MCU); and the embedded controller determines that the central processing unit accesses at least one downlink device, for example, a board EEPROM, a voltage detection chip, a temperature detection chip and other I2C devices, according to the interface state of a general-purpose input/output interface output by the baseboard management controller being a low-level state. It might be seen from FIG. 8 that when the target control mode is a cache mode, the embedded controller stores register information about all the downlink devices in a cache area in advance, and the downlink devices are, for example, a board EEPROM, a voltage detection chip, a temperature detection chip and other I2C devices; the central processing unit might send a device read instruction to the embedded controller via an I2C interface; after receiving the device read instruction, the embedded controller parses information carried in the device read instruction, and reads register information corresponding to the matched target device from the cache area; the central processing unit may access the corresponding target device according to the read register information.

In some embodiments, the device is an I2C device and/or an I2C protocol compatible device.

The I2C, i.e., Inter-Integrated Circuit, is a common serial communication protocol. The device may be an I2C device and/or an I2C protocol compatible device, and the I2C protocol compatible device may include a device using the SMBus protocol or a device using the PMBus protocol. The SMBus is a 2-wire bus that might be used in applications that require critical monitoring of parameters, and its most common applications are computer mainboards and embedded systems. In addition, the PMBus is an open standard power management protocol for digital management of power with power control and management devices, with instructions and structures to support power management requirements, I2C and SMBus and PMBus are compatible, and thus, devices may include devices using the SMBus protocol or devices using the PMBus protocol.

In some embodiments, the I2C device is at least one of a board EEPROM, a voltage detection chip, a temperature detection chip, and other I2C device units.

The board Electrically Erasable Programmable read only memory (EEPROM) refers to a charged erasable programmable read-only memory, which is a memory chip without data loss after power down, where the EEPROM might erase existing information on a switch and reprogram it.

In some embodiments, the main controller is an embedded controller, the central processing unit is connected to the embedded controller, the central processing unit comprises an SMBus bus interface and a first general-purpose input/output interface, the embedded controller comprises an I2C bus interface and a second general-purpose input/output interface, wherein the SMBus bus interface of the central processing unit performs data communication with the I2C bus interface of the embedded controller, the first general-purpose input/output interface of the central processing unit is in data communication with the second general-purpose input/output interface of the embedded controller.

In the present embodiment, the baseboard management controller is connected to the embedded controller and comprises a plurality of I2C bus interfaces and a third general-purpose input/output interface, the third general-purpose input/output interface of the baseboard management controller is connected to the first general-purpose input/output interface and the second general-purpose input/output interface, respectively, and each of the I2C bus interfaces of the baseboard management controller is connected to the second general-purpose input/output interface of the embedded controller.

The switch includes a central processing unit, a baseboard management controller, a main controller and at least one device, and for example, as shown in FIG. 2, the switch includes a central processing unit, a baseboard management controller unit, an embedded controller unit, a board EEPROM, a voltage detection chip, a temperature detection chip and other I2C device units.

The central processing unit may be any SOC controller having an SMBus interface, for example, Intel Broadwell D1527/D1627, PHYTIUM FT2000/D2000, etc. mainly used for management and control functions of a switch system; and the central processing unit further includes a first general-purpose input/output interface, and acquires a control signal from the baseboard management controller via the first general-purpose input/output interface, and issues a control instruction and an I2C read/write instruction via the SMBus interface.

The baseboard management controller might be any type of baseboard management controller, for example, Aspeed AST2520; the baseboard management controller realizes the switching of the I2C main controller via a third general-purpose input/output interface control signal, and realizes the issuing of the control instruction and the read/write instruction via various I2C interfaces.

The embedded controller might be any embedded control chip, for example, ST company STM32F103 RBT6, and the internal code thereof is divided into a control logic module and an I2C logic module, where the control logic module is configured to realize switching of an I2C main controller according to an interface state corresponding to the general-purpose input/output interface, and the I2C logic module is configured to realize I2C bus control according to a type of the main controller and the control instruction. The embedded controller includes an I2C bus interface and a second general-purpose input/output interface.

The board EEPROM might be any I2C interface EEPROM memory chip mainly used for storing the switch system and the board information, including but not limited to a switch model number, manufacturer information, serial number, etc.

The voltage detection chip includes, but is not limited to, a DC/DC conversion chip with an I2C interface, a voltage and current ADC detection chip mainly used for detecting the voltage amplitude of each power domain of the switch board in real time, and the temperature detection chip might be any type of temperature detection chip, for example, Sensylink CT7432/CT7112 is mainly used for detecting the internal temperature value of the switch in real time. In addition, other I2C device units refer to other devices/components within the switch that have I2C interfaces (including SMBus interfaces and PMBus interfaces), including but not limited to CPLD chips, RTC chips, PSU modules, etc.

In some embodiments, the methods described above may also be applied to a server.

That is, the above-described method might be applied to a server in addition to being applied to a switch.

Figure 9:
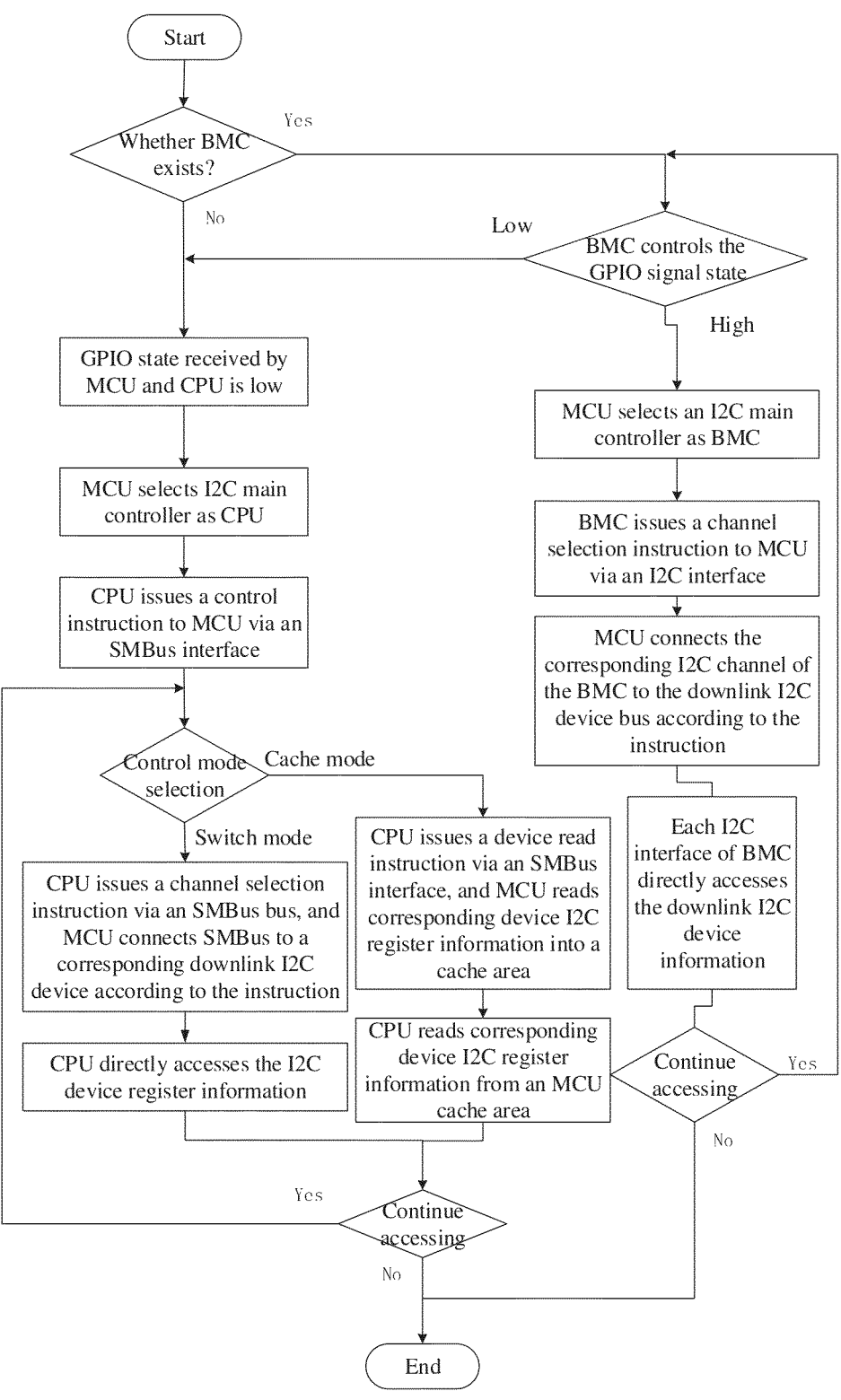
FIG. 9 is a schematic diagram showing a principle of data access according to one or more embodiments.

In an embodiment of a specific switch application scenario, as shown in FIG. 9, FIG. 9 is a schematic diagram showing a principle of data access according to one or more embodiments, including the following steps:

(1) The switch system is started, and the process proceeds to step (2);

(2) If the system does not have the BMC, and the process proceeds to step (3), otherwise, and the process proceeds to step (10);

(3) The CPU and the BMC receive the GPIO state being low, and the MCU determines that the I2C main controller in the system is the CPU according to the GPIO state being low, and the process proceeds to step (4);

(4) The CPU issues a control instruction to the MCU I2C interface via the SMBus bus, selects an I2C bus control mode at the CPU end, and the process proceeds to step (5);

(5) If the control selected by the control instruction issued by the CPU defaults to the switch mode, and the process proceeds to step (6); and if the selected control mode is a cache mode, and the process proceeds to step (8);

(6) The CPU issues a channel selection instruction to the MCU I2C interface via the SMBus bus, the MCU connects the uplink SMBus bus to the selected downlink I2C device bus according to the channel gated by the CPU, and the CPU might directly access the register information about the I2C device, and the process proceeds to step (7);

(7) Whether to continue accessing, and if so, and the process returns to (4); otherwise, and the process proceeds to step (16);

(8) CPU issues a device read instruction via an SMBus interface, and MCU reads corresponding device I2C register information into a cache area, proceeds to step (9);

(9) CPU reads corresponding device I2C register information from an MCU cache area, and the process returns to (7);

(10) The BMC controls the GPIO signal state, and if the BMC output GPIO is low, and the process proceeds to step (3); if the BMC controls the output GPIO thereof to be high, and the process proceeds to step (11);

(11) The CPU and the BMC receive the GPIO state being high, and the MCU determines that the I2C main controller in the system is the BMC according to the GPIO state being high, and the process proceeds to step (12);

(12) Each channel of the BMC issues the channel selection instruction to the MCU via the I2C interface, and the process proceeds to step (13);

(13) According to the channel selection instruction of each I2C interface of the BMC, the MCU connects the BMC I2C interface with a corresponding downlink I2C device bus, and the process proceeds to step (14);

(14) Each I2C interface of the BMC directly accesses the downlink I2C device information, and the process proceeds to step (15);

(15) Whether to continue accessing, and if so, and the process returns to (10); otherwise, and the process proceeds to step (16);

(16) End.

It should be understood that, although the various steps in the above-described flow diagrams are shown sequentially as indicated by the arrows, these steps are not necessarily performed sequentially in the order indicated by the arrows. The steps are performed in no strict order unless explicitly stated herein, and the steps may be performed in other orders. Further, at least a portion of the steps in the above flow diagram may include multiple sub-steps or stages, which are not necessarily executed simultaneously but may be carried out at different timings. The execution sequence of these sub-steps or stages is not necessarily consecutive and may alternate or interleave with at least some of the sub-steps or stages of other steps.

Figure 10:
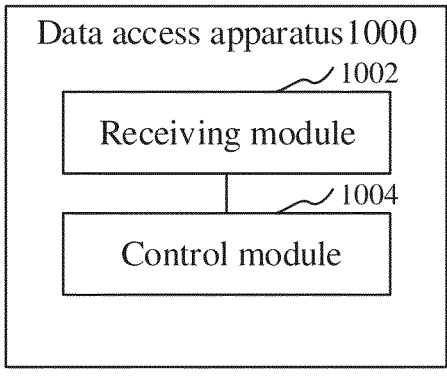
FIG. 10 is a structural block diagram showing a data access apparatus according to one or more embodiments.

In some embodiments, as shown in FIG. 10, a data access apparatus 1000 is provided, where the apparatus is applied to a switch, the switch includes a central processing unit, a baseboard management controller, a main controller and at least one device, the central processing unit and the baseboard management controller are respectively connected to the main controller, and the main controller is connected to the at least one device, where the apparatus includes: a receiving module 1002 and a control module 1004, where:

a receiving module 1002 is configured to receive, by a main controller, an interface state corresponding to a target interface; and a control module 1004 is configured to allow, by the main controller, according to the interface state, a central processing unit or a baseboard management controller to access at least one device.

In some embodiments, the receiving module 1002 is configured to control, by the baseboard management controller, an interface state corresponding to a general-purpose input/output interface, and receive, by the main controller, the interface state corresponding to the general-purpose input/output interface output by the baseboard management controller.

In some embodiments, the control module 1004 is configured to determine, by the main controller, whether the interface state is a high-level state or a low-level state, and allow, by the main controller, the baseboard management controller to access the at least one device in response to the main controller determining that the interface state is the high-level state.

In some embodiments, the control module 1004 is configured to send, by the baseboard management controller, a channel selection instruction to the main controller, connect, by the main controller, a target interface channel corresponding to the baseboard management controller to the matched target device bus according to the channel selection instruction, and access, by the baseboard management controller, a target device corresponding to the target device bus upon the successful connection.

In some embodiments, the control module 1004 is configured to issue corresponding channel selection instructions to the main controller using corresponding I2C interfaces via a plurality of interface channels of the baseboard management controller.

In some embodiments, the control module 1004 is configured to connect, by the main controller, each of the I2C interfaces to the matched target device bus according to each of the channel selection instructions.

In some embodiments, the control module 1004 is configured to allow, by the central processing unit, the main controller to access the at least one device in response to the main controller determining that the interface state is a low-level state.

In some embodiments, the control module 1004 is configured to send, by the central processing unit, a control instruction to the main controller, select, by the main controller, the target control mode according to the control instruction, and allow, by the main controller, the central processing unit to access at least one device according to the target control mode.

In some embodiments, the control module 1004 is configured to, when the target control mode is a switch mode, send, by the central processing unit, the channel selection instruction to the main controller; determine, by the main controller, the corresponding target interface channel according to the channel selection instruction; connect, by the main controller, the channel interface corresponding to the target interface channel to the matched target device bus; and upon the successful connection, access, by the central processing unit, the target device corresponding to the target device bus.

In some embodiments, the control module 1004 is configured to, when the target control mode is a cache mode, send, by a central processing unit, a device read instruction to a main controller, read, by the main controller, register information corresponding to a matched target device from a cache area according to the device read instruction, where the cache area includes register information corresponding to each device, and access, by the central processing unit, the target device according to the register information.

In some embodiments, when the baseboard management controller in the switch is not started, the data access apparatus 1000 is configured to receive, by the main controller, an interface state corresponding to the general-purpose input/output interface as a low-level state, and allow, by the main controller, the central processing unit to access at least one device according to the low-level state.

In some embodiments, when the baseboard management controller in the switch is not started, the data access apparatus 1000 is configured to send, by the central processing unit, a control instruction to the main controller, select, by the main controller, the target control mode according to the control instruction, and allow, by the main controller, the central processing unit to access at least one device according to the target control mode.

In some embodiments, when the baseboard management controller in the switch is not started, the data access apparatus 1000 is configured to, when the target control mode is a switch mode, send, by the central processing unit, the channel selection instruction to the main controller; determine, by the main controller, the corresponding target interface channel according to the channel selection instruction; connect, by the main controller, the channel interface corresponding to the target interface channel to the matched target device bus; and upon the successful connection, access, by the central processing unit, the target device corresponding to the target device bus.

In some embodiments, when the baseboard management controller in the switch is not started, the data access apparatus 1000 is configured to, when the target control mode is a cache mode, send, by a central processing unit, a device read instruction to a main controller, read, by the main controller, register information corresponding to a matched target device from a cache area according to the device read instruction, where the cache area includes register information corresponding to each device, and access, by the central processing unit, the target device according to the register information. In some embodiments, the device is at least one of a board EEPROM, a voltage detection chip, a temperature detection chip, and other I2C device units.

In some embodiments, the main controller is an embedded controller, the central processing unit is connected to the embedded controller, the central processing unit comprises an SMBus bus interface and a first general-purpose input/output interface, the embedded controller comprises an I2C bus interface and a second general-purpose input/output interface, wherein the SMBus bus interface of the central processing unit performs data communication with the I2C bus interface of the embedded controller, the first general-purpose input/output interface of the central processing unit is in data communication with the second general-purpose input/output interface of the embedded controller.

In some embodiments, the baseboard management controller is connected to the embedded controller and comprises a plurality of I2C bus interfaces and a third general-purpose input/output interface, the third general-purpose input/output interface of the baseboard management controller is connected to the first general-purpose input/output interface and the second general-purpose input/output interface, respectively, and each of the I2C bus interfaces of the baseboard management controller is connected to the second general-purpose input/output interface of the embedded controller.

15

In some embodiments, the data access apparatus 1000 may also be applied to a server.

For the specific definition of the data access apparatus, reference might be made to the above definition of the data access method, which will not be described in greater detail herein. The various modules in the data access apparatus described above may be implemented in whole or in part by software, hardware, or a combination thereof. The above-mentioned modules may be embedded in the form of hardware in a processing unit in the switch or stored in the form of software in a memory in the switch, so that the processing unit calls to perform the corresponding operations of the above-mentioned modules.

Figure 11:
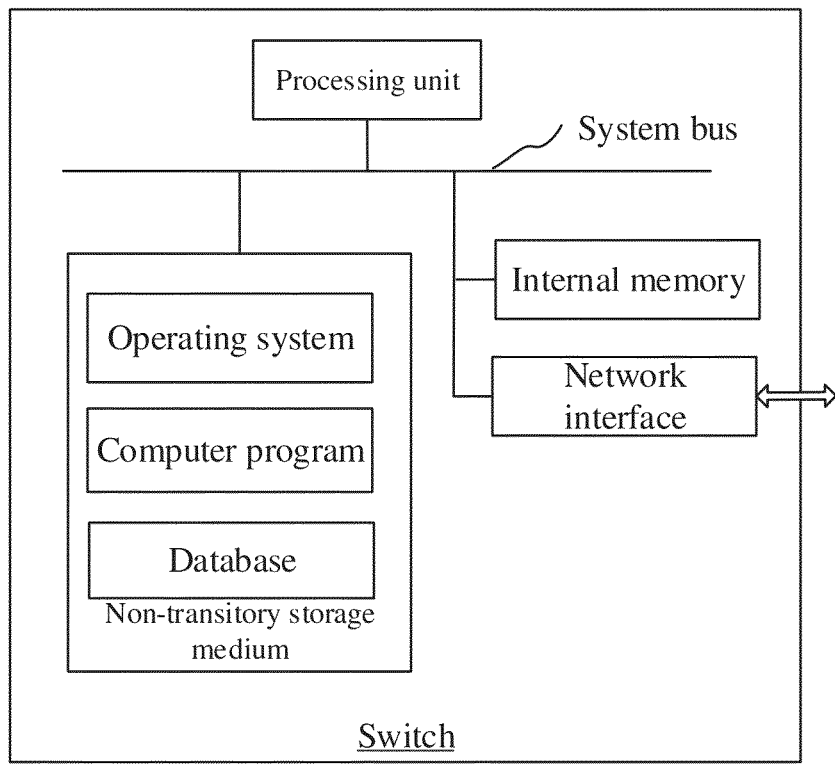
FIG. 11 is an internal structural diagram showing a switch according to one or more embodiments.

In some embodiments, a switch is provided and may be a server, the internal structure of which may be as shown in FIG. 11. The switch includes a processing unit, a memory, a network interface, and a database connected by a system bus. The processing unit of the switch is configured to provide computing and control capabilities. The memory of the switch includes a non-transitory storage medium and an internal memory. The non-transitory storage medium stores an operating system, computer programs, and a database. The internal memory provides an environment for the operation of the operating system and computer programs in the non-transitory storage medium. The database of the switch is used to store interface state. The network interface of the switch is used to communicate with an external terminal via a network connection. The computer program, when executed by a processing unit, implements a data access method.

A person skilled in the art will appreciate that the structure illustrated in FIG. 11 is merely a schematic structural diagram showing a portion of the structure related to the solution of the present application and does not limit the switch to which the solution of the present application is applied. A specific switch may include more or fewer components than those shown in the figure, or combine certain components, or have a different arrangement of components.

In some embodiments, a switch is provided, the switch including a memory, a processing unit and a computer program stored on the memory and executable on the processing unit, where the processing unit, when executing the computer program, performs the following steps: an interface state corresponding to a target interface is received by a main controller, and a central processing unit or a baseboard management controller is allowed by the main controller to access at least one device according to the interface state.

In some embodiments, a processing unit, when executing a computer program, implements the data access method of any one or more of the embodiments described above.

In some embodiments, a non-transitory computer-readable storage medium is provided, on which a computer program is stored which, when executed by a processing unit, performs the following steps: an interface state corresponding to a target interface is received by a main controller, and a central processing unit or a baseboard management controller is allowed by the main controller to access at least one device according to the interface state.

In some embodiments, a processing unit, when executing a computer program, implements the data access method of any one or more of the embodiments described above.

It will be understood by a person skilled in the art that all or part of the flows of the methods of the embodiments described above may be implemented by hardware instructions of a computer program, which may be stored in a non-transitory computer-readable storage medium, and when executed, may include the flows of the embodiments of the methods described above. Any reference to memory, storage, databases, or other media used in the various embodiments provided herein may include, among other things, nonvolatile and/or volatile memory. Non-transitory memory may include read only memory (ROM), programmable ROM (PROM), electrically programmable ROM (EPROM), electrically erasable programmable ROM (EEPROM), or flash memory. Volatile memory may include random access memory (RAM) or external cache memory. By way of illustration but not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink, DRAM (SLDRAM), Rambus direct RAM (RDRAM), direct rambus dynamic RAM (DRDRAM), and a memory bus dynamic RAM (RDRAM) or the like.

Each technical feature of the above-mentioned embodiments might be combined in any combination, and in order to make the description concise, not all the possible combinations of each technical feature in the above-mentioned embodiments are described; however, as long as there is no contradiction between the combinations of these technical features, they should be considered as the scope of the description.

The embodiments described above represent only a few embodiments of the present application and are described in more detail and are not to be construed as limiting the scope of the present application. It should be noted that several variations and modifications might be made by a person skilled in the art without departing from the inventive concept, which is within the scope of the present application. Accordingly, the protection sought in the present application is as set forth in the claims below.

What is claimed is:

1. A data access method, being applied to a switch, the switch comprising a central processing unit, a baseboard management controller, a main controller and at least one device, the central processing unit and the baseboard management controller being each connected to the main controller, and the main controller being connected to the at least one device, wherein the method comprises:

controlling, by the baseboard management controller, an interface state corresponding to a general-purpose input or output interface;

receiving, by the main controller, the interface state corresponding to the general-purpose input or output interface output by the baseboard management controller;

determining, by the main controller, whether the interface state is a high-level state or a low-level state;

allowing, by the main controller, the baseboard management controller to access the at least one device in response to the main controller determining that the interface state is the high-level state; and allowing, by the main controller, the central processing unit to access the at least one device in response to the main controller determining that the interface state is the low-level state;

wherein the allowing, by the main controller, the central processing unit to access the at least one device comprises:

sending, by the central processing unit, a control instruction to the main controller;

selecting, by the main controller, a target control mode according to the control instruction; and allowing, by the main controller, the central processing unit to access the at least one device according to the target control mode.

2. The method according to claim 1, wherein the allowing, by the main controller, the baseboard management controller to access the at least one device comprises:

sending, by the baseboard management controller, channel selection instructions to the main controller;

connecting, by the main controller, a target interface channel corresponding to the baseboard management controller to a target device bus after being matched according to the channel selection instructions; and accessing, by the baseboard management controller, a target device corresponding to the target device bus in response to a successful connection.

3. The method according to claim 2, wherein the sending, by the baseboard management controller, channel selection instructions to the main controller comprises:

issuing, by a plurality of interface channels of the baseboard management controller, corresponding channel selection instructions to the main controller using corresponding Inter-Integrated Circuit (I2C) interfaces.

4. The method according to claim 3, wherein the connecting, by the main controller, a target interface channel corresponding to the baseboard management controller to a target device bus after being matched according to the channel selection instructions comprises:

connecting, by the main controller, each of the I2C interfaces to the target device bus according to each of the channel selection instructions.

5. The method according to claim 1, wherein the allowing, by the main controller, the central processing unit to access the at least one device according to the target control mode comprises:

sending, by the central processing unit, channel selection instructions to the main controller in response to the target control mode being a switch mode;

determining, by the main controller, a corresponding target interface channel according to the channel selection instructions;

connecting, by the main controller, a channel interface corresponding to the target interface channel to a target device bus after being matched; and accessing, by the central processing unit, a target device corresponding to the target device bus in response to a successful connection.

6. The method according to claim 1, wherein the allowing, by the main controller, the central processing unit to access the at least one device according to the target control mode comprises:

sending, by the central processing unit, a device read instruction to the main controller in response to the target control mode being a cache mode;

reading, by the main controller, register information corresponding to a target device after being matched from a cache area according to the device read instruction, wherein the cache area comprises register information corresponding to each device of the at least one device; and accessing, by the central processing unit, the target device according to the register information.

7. The method according to claim 1, wherein in response to the baseboard management controller in the switch not being started, the method further comprises:

receiving, by the main controller, the interface state corresponding to the general-purpose input or output interface as the low-level state; and allowing, by the main controller, the central processing unit to access the at least one device according to the low-level state.

8. The method according to claim 7, wherein the allowing, by the main controller, the central processing unit to access the at least one device according to the low-level state comprises:

sending, by the central processing unit, the control instruction to the main controller;

selecting, by the main controller, the target control mode according to the control instruction; and allowing, by the main controller, the central processing unit to access the at least one device according to the target control mode.

9. The method according to claim 8, wherein the allowing, by the main controller, the central processing unit to access the at least one device according to the target control mode comprises:

sending, by the central processing unit, channel selection instructions to the main controller in response to the target control mode being a switch mode;

determining, by the main controller, a corresponding target interface channel according to the channel selection instructions;

connecting, by the main controller, a channel interface corresponding to the corresponding target interface channel to a target device bus after being matched; and accessing, by the central processing unit, a target device corresponding to the target device bus in response to a successful connection.

10. The method according to claim 8, wherein the allowing, by the main controller, the central processing unit to access the at least one device according to the target control mode comprises:

sending, by the central processing unit, a device read instruction to the main controller in response to the target control mode being a cache mode;

reading, by the main controller, register information corresponding to a target device after being matched from a cache area according to the device read instruction, wherein the cache area comprises the register information corresponding to each device of the at least one device; and accessing, by the central processing unit, the target device according to the register information.

11. The method according to claim 1, wherein the at least one device is at least one of an Inter-Integrated Circuit (I2C) device or an I2C protocol compatible device.

12. The method according to claim 11, wherein the I2C device is at least one of a board Electrically Erasable Programmable Read Only Memory (EEPROM), a voltage detection chip, a temperature detection chip, or I2C device units.

13. The method according to claim 1, wherein the main controller is an embedded controller, the central processing unit is connected to the embedded controller, the central processing unit comprises a System Management Bus (SMBus) bus interface and a first general-purpose input or output interface, the embedded controller comprises an Inter-Integrated Circuit (I2C) bus interface and a second general-purpose input or output interface, wherein the SMBus bus interface of the central processing unit is in data communication with the I2C bus interface of the embedded controller, and the first general-purpose input or output interface of the central processing unit is in data communication with the second general-purpose input or output interface of the embedded controller.

14. The method according to claim 13, wherein the baseboard management controller is connected to the embedded controller and comprises a plurality of I2C bus interfaces and a third general-purpose input or output interface, the third general-purpose input or output interface of the baseboard management controller is connected to the first general-purpose input or output interface and the second general-purpose input or output interface, respectively, and each of the plurality of I2C bus interfaces of the baseboard management controller is connected to the second general-purpose input or output interface of the embedded controller.

15. The method according to claim 1, wherein the method is further applied to a server.

16. A switch, comprising a memory, a processing unit and a computer program stored on the memory and executable on the processing unit, wherein the processing unit, when executing the computer program, is configured to perform a data access method, being applied to the switch, wherein the switch comprises a central processing unit, a baseboard management controller, a main controller and at least one device, the central processing unit and the baseboard management controller being each connected to the main controller, and the main controller being connected to the at least one device;

the data access method comprises:

controlling, by the baseboard management controller, an interface state corresponding to a general-purpose input or output interface;

receiving, by the main controller, the interface state corresponding to the general-purpose input or output interface output by the baseboard management controller;

determining, by the main controller, whether the interface state is a high-level state or a low-level state;

allowing, by the main controller, the baseboard management controller to access the at least one device in response to the main controller determining that the interface state is the high-level state; and allowing, by the main controller, the central processing unit to access the at least one device in response to the main controller determining that the interface state is the low-level state;

wherein the allowing, by the main controller, the central processing unit to access the at least one device comprises:

sending, by the central processing unit, a control instruction to the main controller;

selecting, by the main controller, a target control mode according to the control instruction; and allowing, by the main controller, the central processing unit to access the at least one device according to the target control mode.

17. A non-transitory computer-readable storage medium having stored therein a computer program, the computer program, when executed by a processing unit, is configured to perform a data access method, being applied to a switch, wherein the switch comprises a central processing unit, a baseboard management controller, a main controller and at least one device, the central processing unit and the baseboard management controller being each connected to the main controller, and the main controller being connected to the at least one device;

the data access method comprises:

controlling, by the baseboard management controller, an interface state corresponding to a general-purpose input or output interface;

receiving, by the main controller, the interface state corresponding to the general-purpose input or output interface output by the baseboard management controller;

determining, by the main controller, whether the interface state is a high-level state or a low-level state;

allowing, by the main controller, the baseboard management controller to access the at least one device in response to the main controller determining that the interface state is the high-level state; and allowing, by the main controller, the central processing unit to access the at least one device in response to the main controller determining that the interface state is the low-level state;

wherein the allowing, by the main controller, the central processing unit to access the at least one device comprises:

sending, by the central processing unit, a control instruction to the main controller;

selecting, by the main controller, a target control mode according to the control instruction; and allowing, by the main controller, the central processing unit to access the at least one device according to the target control mode.

18. The method according to claim 9, wherein the method further comprises:

determining whether to continue accessing the at least one device; and in response to continuing accessing the at least one device, returning to the sending, by the central processing unit, a control instruction to the main controller.

19. The method according to claim 10, wherein the method further comprises:

determining whether to continue accessing the at least one device; and in response to continuing accessing the at least one device, returning to the sending, by the central processing unit, a control instruction to the main controller.

* * * * *